Jan. 30, 1951  P. L. SPENCER  2,540,036
FOOD COOKING
Filed March 26, 1948  2 Sheets-Sheet 1
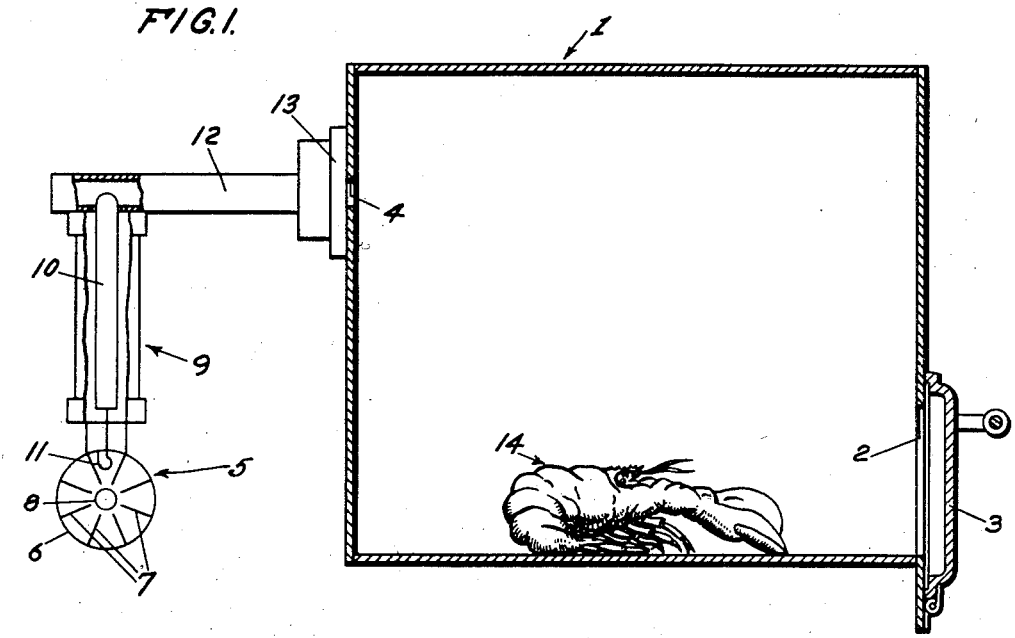
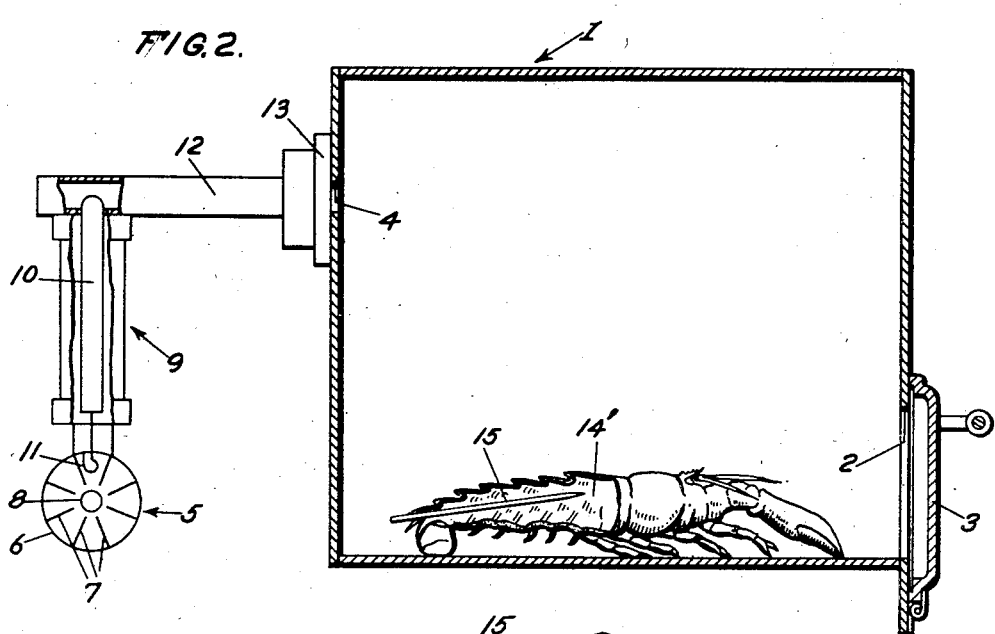
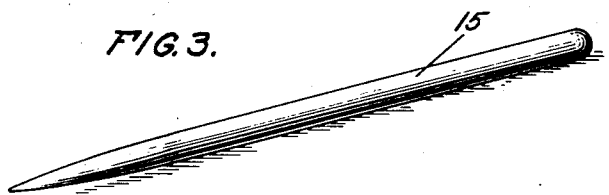
INVENTOR
PERCY L. SPENCER
BY
ATTORNEY Jan. 30, 1951 — P. L. SPENCER — 2,540,036
FOOD COOKING
Filed March 26, 1948 — 2 Sheets-Sheet 2

INVENTOR
PERCY L. SPENCER
BY
ATTORNEY

Patented Jan. 30, 1951

2,540,036

UNITED STATES PATENT OFFICE 2,540,036

FOOD COOKING

Percy L. Spencer, West Newton, Mass., assignor to Raytheon Manufacturing Company, Newton, Mass., a corporation of Delaware Application March 26, 1948, Serial No. 17,235

11 Claims. (Cl. 99—221)

This invention relates to food cooking, and more particularly to the cooking of lobsters and thick bodies of meat by the use of electromagnetic wave energy.

An object of this invention is to devise a method and means for increasing the coupling of high frequency electromagnetic wave energy into the central interior regions of thick bodies of food.

Another object is to provide a method for heating thick bodies of food to a temperature which is substantially uniform throughout such bodies.

A further object is to devise a novel method for broiling lobsters.

A still further object is to devise a method for preventing curling of the tail sections of lobsters during broiling thereof, thereby to maintain such lobsters substantially constant in thickness during such broiling.

An additional object is to devise a method which will prevent curling of the tail sections of lobsters during broiling and will at the same time cause more effective coupling of the heat energy into the interior of the tail sections of such lobsters.

The foregoing and other objects of the present invention will be best understood from the following description of some exemplifications thereof, reference being had to the accompanying drawings, wherein:

Fig. 1 is a vertical sectional view through a microwave cooker, illustrating a lobster being broiled therein without utilizing the present invention;

Fig. 2 is a view similar to Fig. 1, but illustrating a lobster being broiled according to the present invention, the tail portion of the lobster being broken away to show the interior thereof;

Fig. 3 is a side elevation of a dielectric member utilized in the invention.

Figure 4:
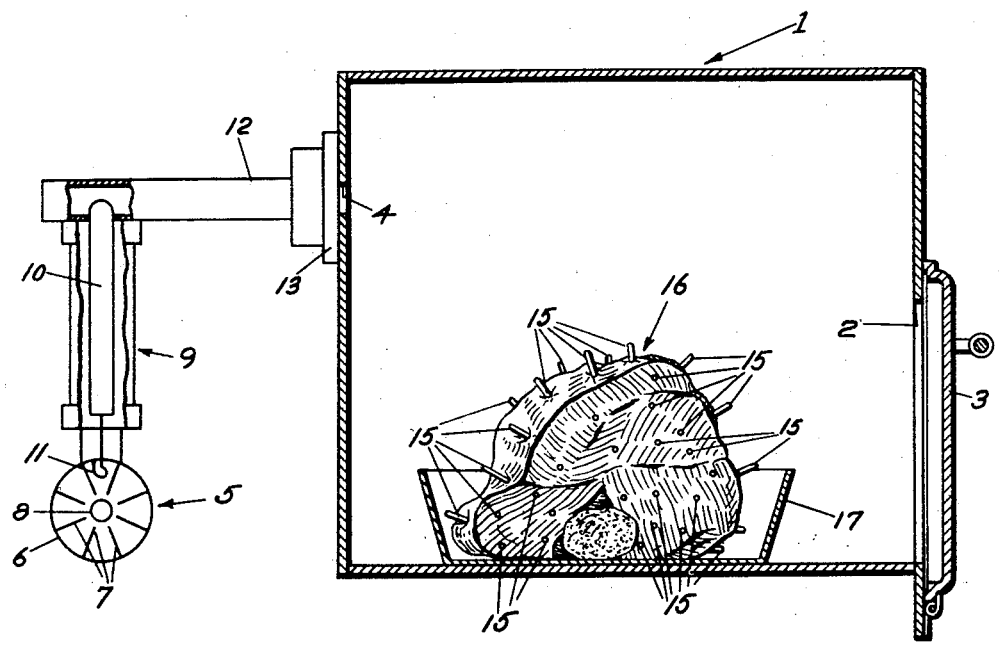
Fig. 4 is a view similar to Fig. 1, but illustrating a roast being cooked according to this invention.

Now referring to Fig. 1, an electronic cooking apparatus or oven is utilized according to this invention for food heating or cooking purposes. This oven may preferably be of the type described and claimed in the copending Hall et al. application, Ser. No. 721,540, filed January 11, 1947. A hollow rectangular prismoidal enclosure or cavity 1 is made of a suitable metal and has rather thin walls as shown; enclosure 1 is adapted to serve as the oven of the electronic heating or cooking apparatus. In order to allow access to the interior of the oven for placing the food therein and for removing the food therefrom, an opening 2 is provided in the front wall of oven 1, this opening being closable by means of a hinged metal door 3. When door 3 is closed, the enclosure 1 is entirely closed, except for an opening 4 for the exciting means to be described hereinafter.

Numeral 5 generally designates an electron discharge device of the magnetron type, which includes, for example, an evacuated envelope 6, made of highly conductive material, such as copper, and provided with a plurality of inwardly-directed, radially-disposed anode vanes 7. The arrangement is such that each pair of adjacent anode vanes forms, together with that portion of the envelope lying therebetween, a cavity resonator whose natural resonant frequency is, as is well-known to those skilled in the art, a function of the geometry of the physical elements making up the same. For the purposes of the present invention it is desirable that the dimensions of each such cavity resonator be such that the wavelength of the electrical oscillations adapted to be generated therein has a predetermined value, for example on the order of ten centimeters. Wavelengths of this order lie in the microwave region of the frequency spectrum. However, electromagnetic wave energy of longer or shorter wavelengths within or without the microwave region is equally applicable for this invention.

Centrally located in envelope 6 is a highly electron-emissive cathode member 8, for example of the well-known alkaline-earth metal oxide type, said cathode member being provided with conventional means (not shown) for raising the temperature thereof to a level sufficient for thermionic emission.

The electron discharge device 5 is completed by magnetic means (not shown) for establishing a magnetic field in a direction transversely of the electron path between the cathode and anode members thereof.

Magnetron 5 is energized from any suitable source (not shown) and when so energized delivers high frequency electromagnetic wave energy having a predetermined wavelength to a coaxial transmission line 9, the inner conductor 10 of which is coupled to oscillator 5 by a loop 11 and the outer conductor of which is connected to envelope 6. The high frequency electromagnetic waves are delivered in turn to a hollow rectangular waveguide 12 by transmission line 9;

the central conductor 10 of line 9 extends into the interior of waveguide 12 near one end thereof, through an opening provided in one side wall of said guide, to serve as an exciting rod or exciting probe for said guide.

The end of guide 12 nearest this exciting rod is closed, while the opposite end of said guide is fastened to the rear wall of enclosure 1 by fastening means 13 and is open. The interior of guide 12 is placed in energy-transmitting relationship with the interior of cavity 1 by means of a rectangular aperture 4 provided in the rear wall of said cavity, this aperture being of the same size and configuration as the interior of guide 12 and being aligned with said guide to place the interior of said guide in communication with the interior of cavity 1.

Microwave energy is fed by coaxial line 9 and waveguide 12, from magnetron oscillator 5 to the interior of oven 1, thereby filling substantially the entire interior of enclosure 1 with electromagnetic wave energy, for example in the microwave region of the frequency spectrum. For a more complete explanation of the operation of such an oven, reference should be had to the above-identified Hall et al. application.

It has been found that an electronic oven such as that described may be utilized for the broiling of live lobsters, and that, when this is done, lobsters may be broiled in an extremely short time interval, on the order of two minutes as compared with the approximately eighteen minutes required by conventional broiling techniques. In order to so utilize such an oven, a live lobster 14 is first placed inside enclosure 1 by means of door 3, the lobster resting on the bottom wall of the enclosure 1, after which magnetron 5 is energized to supply electromagnetic wave energy in the microwave range to the interior of oven 1, such energy substantially filling said interior as above described. The lobster is composed of non-metallic or dielectric material, and such dielectric material has a large affinity for electromagnetic wave energy, particularly if such energy lies in the microwave region. Therefore, since this is true, the lobster rapidly absorbs the wave energy in enclosure 1, this energy being converted to heat in the lobster meat, thereby broiling said lobster.

It has been found that, when a live lobster is broiled in the above manner, or in any other manner, for that matter, the lobster always attempts to, and does, roll up or curl his tail section under the rest of his length, as illustrated in Fig. 1. This not only causes the rear body portion to have a greater overall height or thickness than the remainder of the lobster, but causes the meat of the body to overlie the meat of the tail section. Since the rear body portion is thus artificially made thicker than other parts of the lobster, such as the claws for example, non-uniform cooking of the lobster results, more energy being required to properly cook this exceedingly thick rear body portion than is required to properly broil thinner portions of the lobster. This result may be due to the shielding from the wave energy of the lower curled-up portion by the overlying body portion. In any event, this non-uniform cooking rate or action tends to cause overcooking of the thinner portions, such as the claws, in the time required for proper broiling of the artificially-thickened rear body portion, and is an undesired result.

Now, according to this invention, means is provided and utilized for preventing curling of the lobster's tail section during broiling of said lobster. In order to accomplish this result, I utilize a rigid pencil-like rod 15 of dielectric material, such as polystyrene for example, this rod being shown in detail in Fig. 3. Rod 15 is preferably circular in transverse cross-section, is of rather small diameter, on the order of one-fourth inch, and is pointed or made sharp at one end as shown. Prior to placing of the lobster in oven 1 to be broiled, rod 15 is inserted, point end first, into the anus of the lobster, which is at the tail end thereof, and is pushed up the lobster's spine, longitudinally of his tail section, a sufficient distance until the pointed end of said rod is adjacent the front end of the lobster's articulated or flexible tail section. In a lobster, there is a straight channel, for the rod to fit in, which extends through the whole length of the lobster's tail section.

Now referring to Fig. 2, the lobster 14', having rod 15 extending internally thereof and substantially longitudinally of the tail section thereof, is placed inside enclosure 1 of the heating apparatus and the electromagnetic wave energy is thereafter supplied to said enclosure as in Fig. 1. In other words, the lobster 14' and rod 15 as a unit are exposed to electromagnetic wave energy. Due to the fact that rod 15 is rigid and is in firm engagement with the body of the lobster by being entirely surrounded by said body, the tail section of said lobster cannot curl up during broiling, so that said tail section is maintained straight during broiling of the lobster, as illustrated in Fig. 2. As a result, the lobster is maintained at a minimum thickness throughout his length during the entire broiling, so that there is no possibility of one portion of the lobster's body artificially shielding another portion thereof during broiling. Therefore, the non-uniformity of cooking rate which could result from artificial thickening of the lobster is entirely eliminated.

The tail section of a lobster is the part thereof which has the largest cross-section of the entire lobster, and it is therefore desirable, in order to increase the uniformity of heating or cooking of said lobster, to increase the coupling of electromagnetic wave energy into the interior of this thick tail section. I have found that, if the rigid tail rod 15 is made of dielectric material having a low-loss factor such as polystyrene, not only is the tail section of the lobster 14' prevented from curling during broiling, but also the coupling of microwave electromagnetic energy into the tail section is increased. In other words, by the utilization of a dielectric rod 15, the coupling of electromagnetic wave energy into the portion of the food body into which said rod is inserted may be increased; thus, a higher percentage of the dielectric losses occurs in such portion and more heat is developed therein.

The reasons for this increased coupling action are rather obscure at present, and it is not known exactly why or how this effect takes place. However, one possible explanation runs somewhat as follows. The rod 15 has a dielectric constant, or a wave impedance, which is appreciably different from that of the meat surrounding it. These two dissimilar dielectrics, one surrounding the other, simulate the conditions necessary for a coaxial or concentric transmission line. Electromagnetic wave energy travels down or along such a line very readily, so that in effect the meat dielectric is opened by the rod 15 and energy travels down the aforesaid line defined by rod 15 to the interior of the tail section of the lobster. Since the electromagnetic wave energy is in effect conducted very readily by rod 15, such energy is very effectively coupled by said rod into the portion of the food body into which said rod is inserted. Thus, in Fig. 2, the coupling of the electromagnetic wave energy into the interior of the lobster's tail section is increased, the coupling of such energy into the interior of said tail section being increased along the entire length of rod 15, since such energy is conducted along said rod.

It will be seen, therefore, that the coupling of electromagnetic wave energy into the central interior regions of thick food bodies may be increased, according to this invention, by insertion of a dielectric member into the central interior region of the food body, from the outside thereof. By preventing curling of the tail sections of lobsters by the method of this invention, as well as by providing better coupling of the wave energy into the interiors thereof by the invention, the lobsters may be heated to a temperature which is substantially uniform throughout the same.

By the use of a dielectric rod according to this invention, the coupling of electromagnetic wave energy into the interior regions of thick food bodies may be increased, as described above. Therefore, this invention is applicable not only to lobsters, but also to other relatively thick food bodies, such as roasts of various kinds. Fig. 4 illustrates the application of the method of this invention to a roast.

A plurality of polystyrene rods 15 are inserted from all directions into a thick roast 16, from the outside toward the interior or central region thereof. As in the case of the lobster, the pointed ends of said rods facilitate the insertion of such rods. Roast 16, with rods 15 therein, is placed in a suitable pan 17, the entire assembly then being placed bodily inside enclosure 1 by means of door 3, after which the magnetron 5 is energized to supply electromagnetic wave energy to the interior of the oven.

Each of the rods 15 constitutes a means for increasing the coupling of electromagnetic wave energy into the interior of the thick food body 16, as described above, so that the said body is heated substantially uniformly throughout its entire volume by said energy.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. The method of increasing the coupling of electromagnetic wave energy into the central interior region of a thick energy-absorbing food body, which consists in inserting a pencil-like polystyrene rod having a tapered end into said body in direct contact therewith from the outside thereof toward said central interior region.

2. The method of heating thick bodies of energy-absorbing material, which consists in inserting a member of dielectric material having a low-loss factor into the body to be heated in direct contact therewith from the outside toward the central interior region thereof, and thereafter exposing said body and member as a unit to electromagnetic wave energy to heat said body to a desired temperature which is substantially uniform throughout said body.

3. The method of heating thick bodies of food, which consists in inserting an elongated tapered member of dielectric material having a low loss factor into the food body to be heated from the outside toward the central interior region thereof, and thereafter exposing said body and member as a unit to electromagnetic wave energy to heat said body to a desired temperature which is substantially uniform throughout said body.

4. The method of cooking thick bodies of food, which consists in inserting a pointed pencil-like polystyrene rod having a tapered inserting end into the food body to be cooked in direct contact therewith from the outside toward the central interior region thereof, and thereafter exposing said body and member as a unit to electromagnetic wave energy to cook said body substantially uniformly throughout said body.

5. In a radio-frequency heating apparatus, an enclosure, means for applying electromagnetic wave energy to said enclosure, said enclosure being adapted to contain a lobster to be heated, and an elongated pointed member of dielectric material introduced into said lobster for increasing the coupling of said energy into the central interior region thereof, said member having an impedance appreciably different from that of said body.

6. In a radio-frequency heating apparatus, means for applying electromagnetic wave energy to a body to heat the same, and a rod of dielectric material having a low-loss factor and a tapered end extending through said body in direct contact therewith from the outside into the central interior region thereof, said rod having an impedance appreciably different from that of said body.

7. The method of preventing curling of the tail section of a lobster during broiling thereof and of increasing the coupling of electromagnetic wave energy into the interior of said lobster, which consists in inserting a rigid member having a low-loss factor longitudinally of said tail section prior to broiling of said lobster while maintaining said member in said tail section during such broiling.

8. The method of preventing curling of the tail section of a lobster during broiling thereof and of increasing the coupling of electromagnetic wave energy into the interior of said lobster, which consists in inserting a rigid rod of dielectric material having a low-loss factor longitudinally of said tail section prior to broiling of said lobster while maintaining said member in said tail section during such broiling.

9. The method of broiling lobsters, which consists in inserting a dielectric member having a low-loss factor longitudinally of the tail section of a lobster to be broiled, and thereafter exposing said lobster with said member therein to electromagnetic wave energy to heat said lobster.

10. The method of broiling lobsters, which consists in inserting an elongated rigid dielectric member having a low-loss factor longitudinally of the tail section of a lobster to be broiled, and thereafter exposing said lobster with said member therein to electromagnetic wave energy to heat said lobster.

11. The method of broiling lobsters, which consists in inserting a pencil-like polystyrene rod longitudinally of the tail section of a lobster to be broiled, and thereafter exposing said lobster with said member therein to electromagnetic wave energy to heat said lobster.

PERCY L. SPENCER.

(References on following page)

REFERENCES CITED

The following references are of record in the file of this patent:

UNITED STATES PATENTS

| Number | Name | Date |
|---|---|---|
| 734,305 | Crotie | July 21, 1903 |
| 2,197,123 | King | Apr. 16, 1940 |
| 2,207,845 | Wolff | July 16, 1940 |
| 2,280,771 | Dufour et al. | Apr. 28, 1942 |
| 2,404,191 | Quayle et al. | July 16, 1946 |
| 2,407,690 | Southworth | Sept. 17, 1946 |
| 2,413,003 | Sherman | Dec. 24, 1946 |
| 2,495,170 | Kinn | Jan. 17, 1950 |
| 2,497,670 | Hanson et al. | Feb. 14, 1950 |

FOREIGN PATENTS

| Number | Country | Date |
|---|---|---|
| 118,453 | Australia | Apr. 26, 1944 |

OTHER REFERENCES

"Magnetron Adapted to Cooking Purposes," Electrical Engineering, Dec. 1946, page 591.

Engineering Abstracts, Product Engineering, January 1947, pages 137–140.